Trask & Aldrich.
Mower.

Nº 1370.  Patented Oct. 16, 1839.

UNITED STATES PATENT OFFICE.

A. P. TRASK AND D. ALDRICH, OF ELLINGTON, NEW YORK.

IMPROVEMENT IN MOWING-MACHINES.

Specification forming part of Letters Patent No. 1,370, dated October 16, 1839.

*To all whom it may concern:*

Be it known that we, ASA P. TRASK and DAVIS ALDRICH, of Ellington, in the county of Chautauqua and State of New York, have invented a new and useful machine for cutting grain and grass and laying the same in gavels and windrows by horse-power, which is described as follows, reference being had to the annexed drawings of the same, making part of this specification.

Figure 3:
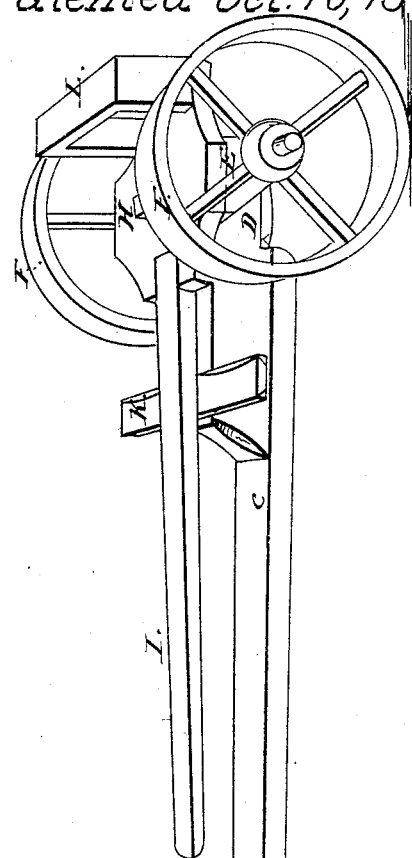
Figure 2:
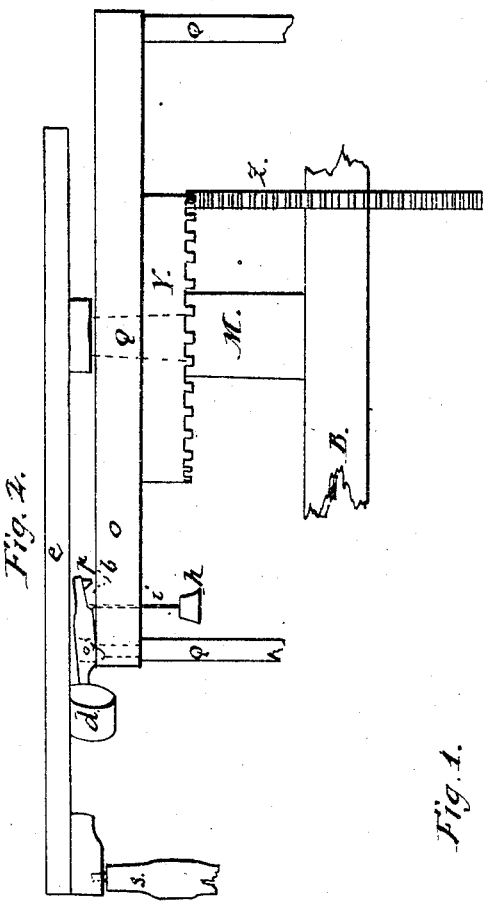
Figure 1:
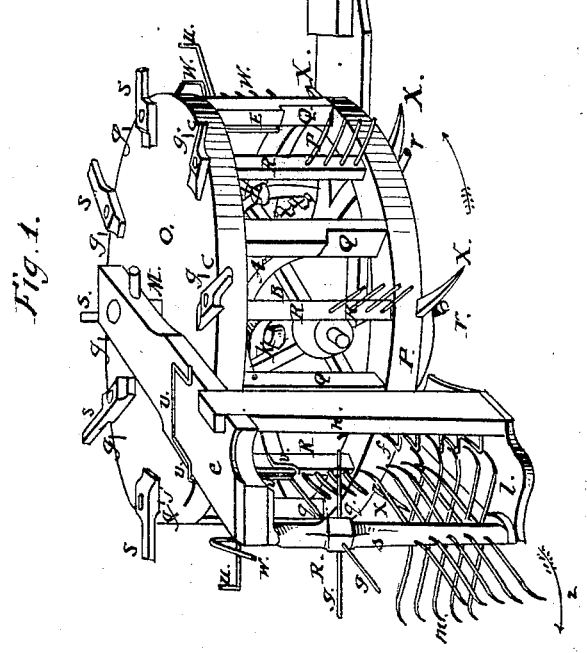

Figure 1 is a perspective view of the machine. Fig. 2 is a section. Fig. 3 is a section of the inclined plane.

This machine consists of a pair of large wheels, A A, Fig. 1, connected by an axle-tree, B, and turning on the ground in the manner of the fore wheels of a wagon. From said axle-tree there extends back a coupling-pole, C, forked at the rear end at D, which connects to another axle-tree in the rear, (marked E,) mortised in the center, through which passes one prong of the coupling-pole, the other prong being below, a bolt passing vertically through the axle-tree and coupling-pole, so as to allow said axle-tree to turn freely to the right or left on said bolt for steering the machine, as hereinafter described. On this axle-tree are two wheels, F F, similar to those on the forward axle-tree.

To the top of the hind axle-tree, E, is fastened a tongue, I, or tiller, which extends between the horses, and is attached to them by cords or straps. The whiffletree K, to which the horses are attached by the usual gearing, crosses the coupling-pole at right angles in front of the hind wheels, the heads of the horses being toward the forward wheels. On the hind axle-tree is erected a seat, L, for the driver.

In the center of the forward axle-tree, B, is mortised and tenoned or otherwise fastened a vertical post, M, on which is turned a round neck, which passes through a circular aperture in the center of a round head, O, of a large revolving cutting-wheel, which turns horizontally on the shoulders of said neck. This wheel is composed of the before-mentioned circular head O and a series of hanging posts, Q, fastened at their upper ends to the periphery of said head and at their lower ends to a circular suspended rim, P, to which the scythes X or cutting-instruments are fastened, and in which pivots of the movable cradles turn. The diameter of the rim inside must be such as to allow the fore wheels and graining to turn freely inside of said rim, posts, and cradles or skeleton wheels. Said wheel is turned horizontally by means of a horizontal crown-wheel, Y, fastened to the under side of the head O, into which mesh the cogs of a vertical wheel, Z, fastened on the hub of one of the forward wheels A.

The scythes X, for cutting the grain, are fastened obliquely to the under side of the rim P in the manner of other mowing-machines, and under each is arranged a roller, r, to prevent striking against the ground, &c. The cradles R, for gathering and depositing the grain as cut against a series of horizontal permanent curved fingers, f, are placed vertically over the scythes, and consist each of a perpendicular piece of wood or bar, R, into which are inserted a series of parallel curved fingers, said bar having a pivot in its lower end turning in an aperture in the rim F and a neck at its upper end passing through an aperture in the head O, and to which is attached a lever, S, for holding the same while receiving and conveying the grain, and for assisting in turning it when discharging or depositing it against the permanent fingers f, which is effected by having a pin, p, on the under side of the lever S, which enters an aperture, b, in the head for holding it, and a wedge-shaped block or inclined plane, d, Figs. 2 and 3, on the under side of a horizontal tube, e, hereinafter described, against which the lever comes in contact, and is pressed down as the wheel revolves and raises the pin from the aperture, which liberates the lever, and thus allows the cradle to swing round and discharge the grain as it comes in contact with the permanent fingers, being prevented from turning too far by a pin or stop, g, in the top of the head; and the cradle is returned to its former position for receiving the grain by a weight, h, attached to the lever by a cord, i, passing over a pulley or through an aperture in the head, the weight hanging below the head, and which is raised as the levers recede. The levers have a vertical motion on the ends of the cradle-shafts on pins passed through them by having the mortises in the levers larger than the tenons of the cradle. The turning back of the cradle for discharging the grain is assisted by a notch, k, and shoulder in the thicker part of the wedge-block, which strikes against the lever and takes off some of the strain from the cradle caused by the arrest of the grain against the permanent fingers.

The horizontal timber e, before mentioned, for suspending a floor, l, and the permanent fingers f and a revolving rake, m, is fastened permanently on the top of the center vertical shaft, M, resting on the forward axle-tree, B, and extends sufficiently far to sustain the floor l clear of the cutting-wheel, which floor is fastened to the bottom or lower end of a hanging post, n, mortised into the horizontal beam e on the under side thereof, in which post are inserted horizontally the permanent-fingers f, before mentioned, for arresting the grain as brought round by the cradles R. A vertical revolving rake, m, for taking the grain from the permanent fingers f and laying it to the right in gavels at the side of the machine, is arranged in front of the stationary fingers f, the lower gudgeon of the shaft turning in the floor and the upper one in the projecting beam above. It consists of the shaft s, with four vertical rows of curved arms inserted therein horizontally and at right angles. The four upper arms, q, are straight. It is turned by means of an arm, u, projecting from the circumference of the cutting-wheel, striking one of said last-mentioned straight arms q; but before this takes place a hanging lock-rod, v, for stopping the motion of the rake, has to be moved back out of the way by another arm, w, which reaches in advance of the one last described for turning the rake.

The arm u, for turning the rake m, as represented, consists of a rod inserted horizontally into the periphery of the cutting-wheel, then bent down at right angles, again at right an angles horizontally, and again at right angles vertically. The arm w, for pushing back the lock, consists of a rod inserted horizontally into to the periphery of the cutting-wheel, then bent down at right angles, then horizontally at right angles, then vertically, and then horizontally and obliquely. The lock v consists of a horizontal axle bent at right angles and lying on top of the horizontal beam, one end extending beyond the end thereof, to which is suspended a rod bent at right angles, forming a figure— thus, ⌐. There are several bent rods similar to those just described for unlocking and for turning the rake, arranged around the periphery of the cutting-wheel, and are placed against the hanging posts to which the rim is suspended.

The center perpendicular shaft or post, M, should be extended above the top of the cutting-wheel, so as to admit of a diagonal brace extending from the side thereof to the under side of the horizontal timber.

The size and proportion of the several parts of the machine may be varied to suit circumstances.

The operation of this machine is as follows: The horses being geared to the whiffletree K and the driver in his seat L, the horses are driven forward with the machine, which advances on the four wheels A and F. The cog-wheel Z on the hub of one of the forward wheels turns the horizontal cog-wheel Y on the cutting-wheel, which it turns in the direction of the arrow 1, the scythes X on the rim thereof cutting the grain, which is received by the cradles R on the sides of the cutting-wheel and carried round to the stationary fingers f, which arrest and receive it from the cradles, the latter being caused to turn back, so as to discharge the grain and pass on, by the friction of the cradle-fingers against the grain, assisted by the jog k on the inclined plane d pressing against the outer end of the lever s after it has been borne down by the inclined plane, and the other end, liberated from the head or the cog of the lever, raised from the aperture in the head, which allows the lever to have a horizontal movement, which turns the cradle until it strikes the pin or stop g in the head, when its motion is arrested. The cradle, having passed the stationary fingers, is returned to its former position by the descent of the weight attached to the end of the lever. Then comes the horizontal oblique arm w, which moves the lock v to the left by coming in contact with it or pressing obliquely against it, and thus allows the revolving rake m to be turned for receiving and carrying the grain and depositing it in gavels on the right of the machine, which is effected by the other arm, u, in the rear of the unlocking-arm w, striking one of the arms q of the rake and giving it an impulse or movement in a contrary direction to that of the cutting-wheel.

If it be desired to turn the machine to the left, the horses must be turned to the right, which will move the tilter I in the same direction, while the machine will move to the left, or in a contrary direction. The machine and horses will travel in the swath.

The arrow 2 indicates the direction of the movement of the revolving rake.

The invention claimed and desired to be secured by Letters Patent consists in—

Placing the two front wheels on which the mowing-machine moves within the wheel of scythes, as described, and also the revolving rake m, for laying the grain in gavels, regulated in its action by the arrangement of the rods and wires u v w, before described, in combination with the wheel of scythes, the whole constructed and operating as described.

ASA P. TRASK.
DAVIS ALDRICH.

Witnesses:
WM. E. OSBORNE,
W. F. HENSHAW.